United States Patent [19]

Tadokoro et al.

[11] 4,275,174

[45] Jun. 23, 1981

[54] NEUTRON SHIELDING POLYMER COMPOSITION AND A PROCESS FOR PRODUCING THE SAME

[75] Inventors: Shin-ichi Tadokoro; Hirozo Segawa, both of Nakajo, Japan

[73] Assignee: Kyowa Gas Chemical Industry Co., Ltd., Tokyo, Japan

[21] Appl. No.: 33,819

[22] Filed: Apr. 26, 1979

[51] Int. Cl.$^3$ .................... C08F 12/08; C08F 120/14; C08K 5/05

[52] U.S. Cl. ........................... 525/1; 428/522; 428/523; 526/195

[58] Field of Search ............... 526/239, 195; 525/1

[56] References Cited

U.S. PATENT DOCUMENTS

| | | | |
|---|---|---|---|
| 2,325,985 | 8/1943 | Semon | 525/1 |
| 2,796,411 | 6/1957 | Zirkle et al. | 526/195 |
| 2,994,713 | 8/1961 | Lane | 526/239 |
| 3,772,357 | 11/1973 | Hamanaka | 525/1 |

*Primary Examiner*—Harry Wong, Jr.
*Attorney, Agent, or Firm*—Gordon W. Hueschen

[57] ABSTRACT

A neutron shielding polymer composition comprising a polymerization product of a base monomer ingredient containing as an essential ingredient at least one monomer selected from the group consisting of alkyl methacrylates containing 1–4 carbon atoms in the alkyl group and styrene in admixture with a saturated boric acid ester which contains as an essential constituent component a polyol containing 3–16 carbon atoms and in which a molar ratio A of said polyol to boron atoms in said boric acid ester formed from said polyol being in the range of $0.6 < A < 4$, the boron content B (wt. %) in the total monomer mixture being in the range of $1 \leq B < 6$.

20 Claims, 2 Drawing Figures

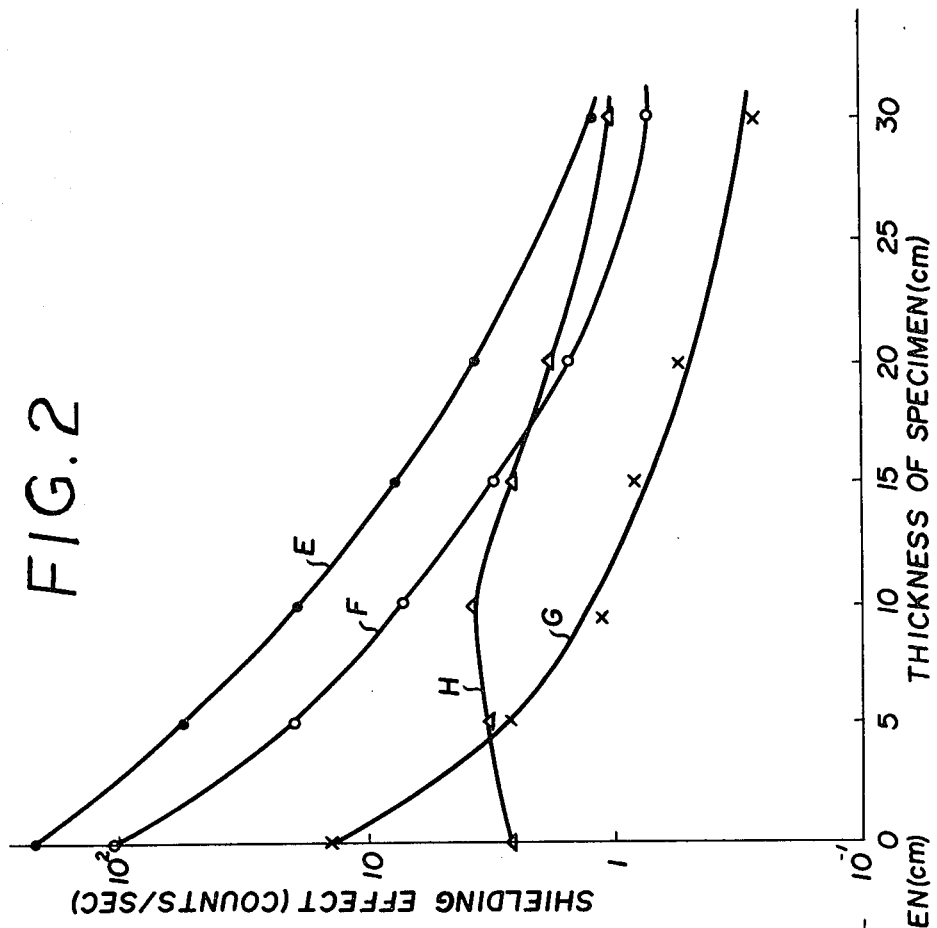

NEUTRON SHIELDING POLYMER COMPOSITION AND A PROCESS FOR PRODUCING THE SAME

The invention relates to a neutron shielding polymer composition with an excellent optical transparency and excellent mechanical strength and also to a process for producing the same.

In recent years, synthetic resins have found wide application in various fields and thus there is an increasing tendency that such resins are required to be imparted with a diversity of characteristic performances. It is well known that polymethylmethacrylate is widely used due to its excellency in transparency. It has been proposed (in U.S. Pat. No. 4,129,524) that the polymethylmethacrylate is imparted with a radiation shielding performance keeping its excellent transparency and mechanical strength by copolymerizing methyl methacrylate and lead acrylate or methacrylate in a specific mixing ratio in the presence of a lead carboxylate. The radiation shielding material of this type exhibits a satisfactory shielding effect against radiations such as x-rays a $\gamma$-ray, $\beta$-ray, and $\alpha$-ray buut its shielding effect against a neutron beam is not adequate.

It is also well known that boron has a neutron shielding ability. Accordingly, there have been proposed a variety of neutron shielding materials using boron such as boron-containing glass, boron-containing polyethylene and the like. However, there is not proposed yet a material which is excellent in both transparency and mechanical strength and which is easy to process.

On the other hand, polymethylmethacrylate compositions containing boron compounds are known in the art (Japanese Patent Publication No. 46-31,847 and Japanese Laid-open Patent Publication No. 52-102,362). However, these compositions are incorporated with such boron compounds merely as a modifier for the polymer so as to impart anti-static proerty to the polymer. That is, the boron content in the polymer is in the range of 0.05–0.67 wt% and thus such compositions hardly show any ability of shielding the neutron beam. Though a boron-containing synthetic resin is obtainable by kneading a boron compound into a transparent resin or by polymerizing a boron compound-containing monomer, there is a limit in kind and amount of the boron compound to be added in order to ensure satisfactory levels of mechanical strength and neutron shielding ability without a sacrifice of excellent transparency inherent in polyalkylmethacrylates or polystyrene. Resin moldings incorporated with boric acid esters which show good transparency at the time of production may often gradually turn to exhibit an opaque white or opaque appearance, as such esters are easily hydrolyzed with water or even with moisture in the air.

It is accordingly an object of the present invention to provide a novel material which exhibits an excellent optical transparency and an excellent mechanical strength and which contains boron in high concentration and thus shows a good neutron shielding performance.

It is another object of the present invention to provide a process for producing the just-mentioned type of a novel neutron shielding material.

These objects can be achieved by an optically-transparent, neutron shielding polymer composition comprising a polymerization product of a base mono-olefinic monomer ingredient containing as an essential ingredient at least one monomer selected from the group consisting of (1) alkyl methacrylates containing 1-4 carbon atoms in the alkyl group and (2) styrene polymerized in admixture with a saturated boric acid ester which contains as an essential constituent component at least one polyol containing 3–16 carbon atoms and in which a molar ratio A of said polyol to boron atoms in said boric acid ester formed from said polyol being in the range of $0.6 < A < 4$, the boron content B (wt%) in the total monomer mixture being in the range of $1 \leq B < 6$.

It has been unexpectedly found that the polymer composition according to the present invention which contains high concentration of boron as obtained by polymerizing the base monomer in admixture with the boric acid ester of the specific type in a specified mixing ratio has a high level of transparency as well as a satisfactory level of mechanical strength. It is very important in industrial and medical points of view that there is provided, according to the invention, a material of a practical and satisfactory neutron shielding performance excellent both in the mechanical strength and in the optical transparency.

In the drawings,

FIG. 1 shows the relations between transmitted neutron dose and the thickness of the neutron shielding material of the invention; and FIG. 2 shows the relations between transmitted neutron dose and the thickness of a polymethylmethacrylate plate.

Briefly stating, as seen from FIG. 2, the polymethylmethacrylate plates are able to moderate the fast neutron but can hardly absorb the thermal neutron produced as the result of the moderation of the fast neutron, thus being not satisfactory as a neutron sheilding material. In this connection, however, the results of FIG. 1 reveal that the boron-containing material according to the invention shows a satisfactory thermal neutron shielding performance and is thus excellent as a neutron shielding material.

The alkyl methacrylates to be used in the present invention are those having 1-4 carbon atoms in the alkyl group and include, for example, methyl methacrylate, ethyl methacrylate, n-propyl methacrylate, isopropyl methacrylate, n-butyl methacryalte, sec-butyl methacryalte, tert-butyl methacrylate and the like. Of these, methyl methacrylate is most preferable. The alkyl methacrylates and styrene may be used singly or in combination of two or more as the base monomer.

The boric acid ester used herein means saturated esters of boric acid or metaboric acid and polyols containing 3–16 carbon atoms (hereinlater referred to simply as boric acid ester). The boric acid ester can be obtained by the esterification reaction between the polyol and boric acid or metaboric acid or by the ester interchange reaction between the polyol and a lower alkyl ester of boric acid.

Where the boric acid ester is prepared by the esterification reaction, it is feasible similarly to the case of a usual esterification reaction. In order to remove the water produced during the course of the esterification reaction, the esterification reaction is conducted in a solvent capable of forming an azeotrope with water under a normal pressure or reduced pressure at an azeotropic temperature of the solvent and water, by which the water is removed azeotropically. After completion of the reaction, the solvent is removed and separated. In this connection, if an alkyl methacrylate such as methyl methacrylate is used as the azeotropic solvent, the monomer mixture necessary for the polymerization can be obtained only by adjusting its concentration by removing part of the alkyl methacrylate after the completion of the esterification reaction.

The polyol, preferably containing 2-3 alcoholic hydroxyl groups and an aliphatic or aromatic hydrocarbon residue containing 3-16, preferably 3-13 carbon atoms. Aside from the above polyols, there may be used polyols having an ether group or an ester group on the like.

Boric acid usually reacts with three hydroxyl groups to form a triester thereof. It may form a diester by reaction with two hydroxyl groups or may form by reaction with an excess of hydroxyl groups a tetraester of the complex compound type expressed, for example, by the following formula

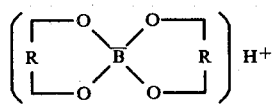

The boric acid esters useful in the invention include all the compounds of the above-mentioned types. Further, at least two hydroxyl groups of the polyol ordinarily takes part in the esterification with the same boric acid molecule but may be esterified with two different boric acid molecules. The boric acid esters used herein include the both types of the esters.

The boric acid esters of the invention may further include those in which part of the three acid groups of boric acid having an ester-forming ability is esterified with a monoalcohol having one alcoholic hydroxyl group in the molecule thereof and the remaining acid groups of the resulting partial ester are esterified with the polyol to form completely esterified boric acid esters.

In the case where the number of carbon atoms of the polyol constituting the boric acid ester used in the invention is 2, the resulting neutron shielding material becomes poor in water resistance and is liable to be turned white in appearance, thus not giving a material with good transparency. On the other hand, the polyol having greater than 17 carbon atoms will lower the content of boron atoms so much and deteriorate the neutron shielding performance of the material, making it difficult to fully achieve the purpose of the invention, coupled with another disadvantage that the mechanical strength of the material is lowered. In order to keep the transparency and the mechanical strength of the material at practical levels, the molar ratio A of the polyol to the boron atoms in the boric acid ester should satisfy the following condition: $0.6 < A < 4$ and preferably $0.6 < A \leq 2$. The amount of the boric acid ester also gives a great influence on the properties of the material and thus the boron content B (wt%) in the total monomer mixture should be controlled as follows: $1 \leq B < 6$ and preferably $1 \leq B \leq 4$. Less amount of the boron content B than 1 wt% will reduce the neutron shielding performance, while larger amount than 6 wt% will undesirably increase the flexibility of the polymer material due to the plasticizing effect of the boric acid ester, resulting in a loss of dimensional stability.

Typical polyols are 1,2-propanediol, 1,3-propanediol, glycerol, 2-methyl-1,2-propanediol, 2-methyl-1,3-propanediol, 2-methylene-1,3-propanediol, 1,2-butanediol, 1,3-butanediol, 1,4-butanediol, 1-butene-3,4-diol, 2-methyl-2,4-butanediol, 3-methyl-1,3-butanediol, 3-methyl-1,2-butanediol, 2-methyl-1,2-butanediol, 2-methyl-1,4-butanediol, 2-methyl-1,3-butanediol, 1,3-pentanediol, 2,2-dimethyl-1,3-propanediol, 2-methyl-2-ethyl-1,3-propanediol, 3-methyl-1,5-pentanediol, 3-methyl-1,3,5-pentanetriol, 2,2-diethyl-1,3-propanediol, 2-methyl-2-propyl-1,3-propanediol, 2-methyl-2,4-pentanediol, 2,4-dimethyl-2,4-pentanediol, 2-ethyl-1,3-hexanediol, 2-methyl-2-butyl-1,3-propanediol, 2-ethyl-2-propyl-1,3-propanediol, 2,2,4-trimethyl-1,3-pentanediol, 2,4-dimethyl-2,4-hexanediol, 3-ethyl-2-isobutyl-1,3-propanediol, 2-propyl-2-butyl-1,3-propanediol, 2,4-dimethyl-2-ethyl-1,3-hexanediol, 2,2-dibutyl-1,3-propanediol, 2-methyl-2-dodecyl-1,3-propanediol, 1,2-pentanediol, 1,2-hexanediol, 1,2-heptanediol, 1,2-octanediol, 1,2-dodecanediol, 1,2-cetanediol, trimethylolpropane, pentaerythritol, diethylene glycol, triethylene glycol, tetraethylene glycol, glycerol monoacetate, glycerol monopropionate, glycerol monobutyrate, glycerol monoisobutyrate, glycerol monovalerate, glycerol monoisovalerate, glycerol monocaprylate, glycerol monocinnamate, trimethylolpropane monoacetate, trimethylolpropane monopropionate, trimethylolpropane monobutyrate, trimethylolpropane monoisobutyrate, trimethylolpropane monobenzoate, trimethylolpropane monocinnamate, pentaerithrythritol monoacetate, pentaerythritol diacetate, pentaerythritol monopropionate, pentaerythritol dipropionate, pentaerythritol monobutyrate, pentaerythritol dibutyrate, pentaerythritol monoisobutyrate, pentaerythritol diisobutyrate, pentaerythritol monovalerate, pentaerythritol monoisovalerate, pentaerythritol monocaprilate, pentaerythritol monobenzoate, 1-phenylethane-1,2-diol, ethylene glycol monoglycolate, ethylene glycol diglycolate, 1,2-proanediol monoglycolate, 1,2-propanediol diglycolate, 1,3-propanediol monoglycolate, 1,3-propanediol diglycolate, 1,2-propanediol monolactate, 1,2-propanediol dilactate, 1,3-propanediol monolactate, 1,3-propanediol dilactate and the like.

Among the above mentioned polyols, 1,3-glycol having the following general formula I

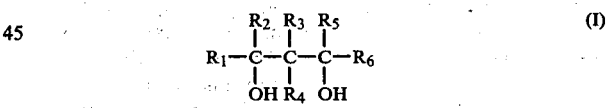

in which $R_1$, $R_2$, $R_3$, $R_5$ and $R_6$ are independently H or an alkyl group containing 1-10 carbon atoms, $R_4$ is H or an alkyl group containing 1-10 carbon atoms and $R_3$ and $R_4$ may represent a methylene group in combination thereof, and the total number of carbon atoms is in the range of 3-13 inclusive gives an especially preferable result. The reason why the 1,3-glycol gives the superior effect is not known exactly, but the 1,3-glycol is seen to form a stable borate in the polymer by reacting with boric acid or metaboric acid. Further, the 1,3-diol having the formula I, wherein $R_1$, $R_2$ and $R_6$ are $CH_3$, $R_3$ and $R_4$ are H, and $R_5$ is H or $CH_3$, i.e., 2-methyl-2,4-pentanediol and 2,4-dimethyl-2,4-pentanediol are the most preferable.

Further, monoalcohols to be reacted with boric acid or metaboric acid in order to form a partial ester of the boric acid are methanol, ethanol, n-propanol, isopropanol, n-butanol, sec-butanol, tert-butanol, 1-pentanol, 1-hexanol, 1-octanol, 2-ethyl hexanol, and the like.

The base monomer useful in the present invention may include, aside from the afore-mentioned essential monomers, other polymerizable monomers within such a range of amount as not adversely affect of the invention. Crosslinkable monomers may be used as said polymerizable monomers so as to impart hardness and dimensional stability to the polymer. Examples of such crosslinkable monomers include ethylene glycol, propylene glycol, polyethylene glycol or polypropylene glycol havinmg an average degree of polymerization of 2–23, diacrylates or dimethacrylates of diols such as linear or branched polyethylene glycol having 3–32 carbon atoms, trimethylolpropane dimethacrylate, trimethylolpropane diacrylate, trimethylolpropane trimethacrylate, trimethylpropane triacrylate, divinyl benzene and the like.

The neutron shielding polymer composition according to the invention may be prepared by any of production processes provided that there is ultimately obtained either a polymer composition composed of a polymer or copolymer containing the afore-said essential monomer or base monomer and the boric acid ester, or a copolymer of the essential or base monomer and the copolymerizable boric acid ester. Conveniently, the monomer mixture is polymerized in a mold or extruder in the presence of an initiator for radical polymerization. The reaction is conducted at a temperature ranging generally 0°–200° C., preferably 20°–180° C. Where a cast plate is made, a multi-stage polymerization process may be used in which process pre-polymerization is effected at 20°–100° C. as usual to convert most of the monomers into a polymer, after which the reaction temperature is increased to 100°–180° C. to convert remaining monomer into a polymer. This multi-stage process is also encompassed within the scope of the invention as its preferred embodiment.

The initiator for radical polymerization is used generally in the range of 0.001–5 wt%, preferably 0.01–1 wt%, of the total monomer used. Typical examples of the initiator include lauroyl peroxide, tert-butyl peroxyisopropyl carbonate, benzoyl peroxide, dicumyl peroxide, tert-butyl peroxyacetate, tert-butyl peroxybenzoate, di-tert-butyl peroxide, azo-bis-isobutyronitrile and the like.

As the boric acid ester used has no double bonds, the produced neutron shielding material is obtained as a polymer solution uniformly dispersing the boric acid ester in the produced polymer or copolymer since the ester exists as the base monomer solution upon the polymerization.

The present invention will be particularly illustrated by way of examples, in which parts and percent are by weight unless otherwise specified.

EXAMPLES 1–18

Synthesis of Boric Acid Ester solutions 61.8 parts of boric acid, polyols in different amounts indicated in Table 1, and 250 parts of methyl methacrylate were fed into a reaction distillator and reacted under reduced pressure at 60° C., produced water being continuously removed azeotropically with methyl methacrylate. The reaction was stopped when a predetermined amount of water was produced. The methyl methacrylate was distilled off so as to adjust the content of boron to a desired level thereby giving an about 2–6% boric acid ester solution in methyl methacrylate (in case of high concentration, precipitation of crystals sometimes took place upon cooling). The test results are shown in Table 1. It is to be noted that Examples 15–18 are for comparative purpose.

EXAMPLE 19–38

Fabrication of Cast Plate

To the monomer mixtures obtained by admixing the methyl methacrylate solutions of boric acid esters prepared in Examples 1–18 with various types of vinyl monomers in amounts indicated in Table 2 was added azo-bis-isobutyronitrile as a radical polymerization initiator to dissolve in 0.015 parts per 100 parts of the monomer mixture. Each solution was cast into a cell assembled with two glass plates and a vinyl chloride resin gasket in a thickness of 20 mm and then subjected to polymerization in a nitrogen atmosphere at 80° C. for 4 hours and then at 120° C. for 2 hours. The properties of the cast sheets thus obtained are shown in Table 2. From the Table 2, it will be appreciated that the materials according to the invention are boron-containing synthetic resins which are excellent in transparency, mechanical strength and neutron shielding performance. It will be noted That Examples 35–38 are for comparison.

TABLE 1

| Example No. | Polyol Compound | Amount (parts) | Molar Ratio A | Amount of Removed Water (parts) | Content of Boron (%) |
|---|---|---|---|---|---|
| 1 | 1,2-propanediol | 152 | 2 | 52 | 6.0 |
| 2 | 1,3-butanediol | 180 | 2 | 50 | 4.0 |
| 3 | 1,4-butanediol | 270 | 3 | 53 | 2.0 |
| 4 | 3-methyl-1,3-butanediol | 208 | 2 | 46 | 4.0 |
| 5 | 2,2-dimethyl-1,3-propanediol | 208 | 2 | 49 | 4.1 |
| 6 | 3-methyl-1,5-pentanediol | 236 | 2 | 47 | 2.1 |
| 7 | 2-methyl-2,4-pentanediol | 236 | 2 | 48 | 2.0 |
| 8 | 2-methyl-2,4-pentanediol | 177 | 1.5 | 46 | 4.0 |
| 9 | 2-methyl-2,4-pentanediol | 118 | 1 | 35 | 5.9 |
| 10 | 2-ethyl-1,3-hexanediol | 438 | 3 | 54 | 2.0 |
| 11 | glycerol | 104 | 2 | 52 | 4.0 |
| 12 | trimethylolpropane | 268 | 2 | 52 | 2.0 |
| 13 | 3-methyl-1,3,5-pentanetriol | 268 | 2 | 51 | 1.9 |
| 14 | 3-methyl-1,3,5-pentanetriol | 134 | 1 | 50 | 6.0 |
| 15 | n-butanol | 222 | 3 | 54 | 2.0 |
| 16 | ethylene glycol | 124 | 2 | 53 | 2.0 |
| 17 | 3-methyl-1,3-butanediol | 416 | 4 | 53 | 2.0 |

TABLE 1-continued

| Example No. | Polyol Compound | Amount (parts) | Molar Ratio A | Amount of Removed Water (parts) | Content of Boron (%) |
|---|---|---|---|---|---|
| 18 | 2-methyl-2,4-pentanediol | 118 | 1 | 36 | 6.2 |

TABLE 2

| Example No. | Boric acid ester Ex.No. | Parts | Added Vinyl Monomer Compound | Parts | Boron Content B in the monomer mixture (%) | Perspectivity* | Mechanical Strength** | $\frac{n}{n_o}$*** |
|---|---|---|---|---|---|---|---|---|
| 19 | 1 | 10 | MMA<br>ethylene glycol dimethacrylate | 8<br>2 | 3 | △ | ◎ | 0.08 |
| 20 | 2 | 10 | MMA<br>ST | 8<br>2 | 2 | △ | ◎ | 0.19 |
| 21 | 3 | 10 | MMA | 10 | 1 | △ | ◎ | 0.43 |
| 22 | 4 | 10 | ethyl methacrylate<br>1,6-hexanediol dimethacrylate | 8<br>2 | 2 | ◎ | ◎ | 0.20 |
| 23 | 5 | 10 | MMA | 10 | 2 | ◎ | ◎ | 0.19 |
| 24 | 6 | 10 | MMA<br>ST | 5<br>5 | 1 | ◎ | ◎ | 0.45 |
| 25 | 7 | 10 | no | — | 2 | ◎ | ○ | 0.18 |
| 26 | 8 | 10 | MMA<br>trimethylolpropane trimethacrylate | 9<br>1 | 2 | ◎ | ◎ | 0.19 |
| 27 | 9 | 10 | MMA<br>ethylene glycol dimethacrylate | 1<br>1 | 5 | ◎ | ○ | 0.015 |
| 28 | 9 | 10 | MMA<br>neopentyl glycol dimethacrylate | 2.8<br>2 | 4 | ◎ | ◎ | 0.03 |
| 29 | 9 | 10 | MMA | 30 | 1.5 | ◎ | ◎ | 0.28 |
| 30 | 10 | 10 | ethyl methacrylate<br>ST | 5<br>5 | 1 | ◎ | ○ | 0.40 |
| 31 | 11 | 10 | MMA | 10 | 2 | △ | ◎ | 0.22 |
| 32 | 12 | 10 | MMA | 3 | 1.5 | ◎ | ◎ | 0.25 |
| 33 | 13 | 10 | butyl methacrylate | 3 | 1.5 |  | ○ | 0.27 |
| 34 | 14 | 10 | MMA<br>1,4-butanediol dimethacrylate | 7<br>3 | 3 | ○ | ◎ | 0.10 |
| 35 | 18 | 10 | MMA<br>ethylene glycol dimethacrylate | 8<br>2 | 1.5 | x | ○ | 0.30 |
|  | 19 | 10 | no | — | 2 | x | ◎ | 0.19 |
| 36 | 20 | 10 | MMA | 10 | 1 | x | ○ | 0.42 |
| 37 | 21 | 10 | no | — | 2 | △ | x | 0.18 |
| 38 | 22 | 10 | no | — | 6.2 | ○ | x | 0.005 |

(MMA means methyl methacrylate.)
(ST means styrene.)
*The measurement of the perspectivity was conducted according to the method prescribed in ASTM D1008. The marks show the following light transmittances.
◎ above 85%, ○ 75–85%, △ 65–75%, x below 65%.
**The measurement of the mechanical strength was conducted according to the method prescribed in ASTM D 790. The marks represent bending strengths as follows.
◎ above 450 kg/cm², ○ 350–450 kg/cm², x below 350 kg/cm².
***The neutron shielding performance was measured in the same manner as in Example 54 appearing hereinlater and was determined as a ratio of a transmittance dose n to a surface dose $n_o$ ($n/n_o$).

EXAMPLE 39

Cast sheets having the same composition as in Example 29 but different thicknesses were each vertically irradiated with fission neutron from $^{252}$Cf of 1 Ci at a distance of 163 cm from the neutron source so as to detect a transmitted neutron beam by means of a BF$_3$ counter which was located behind the cast sheet and at a distance of 239 cm from the neutron source. The BF$_3$ counters were covered with polyethylene sheets with thicknesses of 0, 1.4, 3 and 5 cm and thus were controlled to show maximal sensitivities to thermal neutron, epithermal neutron, neutron of 100–1,000 eV, and neutron of above 100 KeV, respectively. The relations between the thickness of the cast sheet and a transmitted neutron dose are shown in FIG. 1.

For comparison, the above measurement was repeated using polymethyl methacrylate sheets instead of the cast sheets of Example 29 thereby obtaining the results shown in FIG. 2. By comparison between FIGS. 1 and 2, it will be understood that the cast sheets of Example 29 are much more excellent in neutron attenuating ability than the polymethyl methacrylate sheets. It will be noted that, in FIGS. 1 and 2, the curves A and E are for the polyethylene cover thickness of 5 cm, the curves B and F are for the thickness of 3 cm, the curves C and G are for the thickness of 1.4 cm, and the curves D and H are for no polyethylene covering.

EXAMPLE 40

A neutron from the same type of the neutron source as used in Example 39 was irradiated against a laminated sheet of a 25 cm thick polymethyl methacrylate sheet and a 10 cm thick cast sheet with the same composition as used in Example 29 located in the same manner as in Example 39. The laminated sheet was set so that the acryl sheet was faced to the neutron source. In the cast sheet were embedded thermoluminescence dosimeters (TLD) using a $^6$LiF element along the axis of the irradiation neutron at positions of 0, 5 and 10 cm from a boundary between the polymethyl methacrylate sheet and the cast sheet. After the irradiation for 72 hours, the TLDs were taken out to measure the neutron doses. As a result, it was found that relative doses of thermal neutron detected with the respective TLDs which were set at distances of 0 cm, 5 cm and 10 cm from the boundary with the polymethyl methacrylate sheet were, respectively, 1 and $9 \times 10^{-2}$ and $2.8 \times 10^{-2}$. From the results, it will be appreciated that the thermal neutron is intensely absorbed in the cast sheet of the invention.

What is claimed is:

1. An optically-transparent, neutron shielding polymer composition comprising a polymerization product of a base monomer ingredient containing as an essential mono-olefinic ingredient at least one monomer selected from the group consisting of (1) an alkyl methacrylate containing 1–4 carbon atoms in the alkyl group and (2) styrene polymerized in admixture with a boric acid ester of a polyol containing 3–16 carbon atoms and in which a molar ratio A of said polyol to boron atoms in said boric acid ester formed from said polyol being in the range of $0.6 < A < 4$, the boron content B (wt%) in the total monomer mixture being in the range of $1 \leq B < 6$.

2. A polymer composition as defined in claim 1, wherein said polyol is one which has 2–3 alcoholic hydroxyl groups and 3–13 carbon atoms.

3. A polymer composition as defined in claim 2, wherein said polyol is an aliphatic polyol.

4. A polymer composition as defined in claim 3, wherein said polyol is 1,3-glycol expressed by the general formula (I)

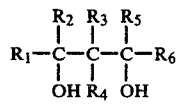

(I)

in which $R_1$, $R_2$, $R_5$ and $R_6$ are independently H or an alkyl group containing 1–10 carbon atoms, $R_4$ is H or an alkyl group containing 1–10 carbon atoms, and $R_3$ and $R_4$ may represent a methylene group in combination thereof and the total number of carbon atoms is the range of 3–13, inclusive.

5. A polymer composition as defined in claim 4, wherein $R_1$, $R_2$ and $R_6$ are $CH_3$, $R_3$ and $R_4$ are H, and $R_5$ is H or $CH_3$.

6. A polymer composition as defined in claim 1, wherein the essential monomer is said alkyl methacrylate.

7. A polymer composition as defined in claim 6, wherein said alkyl methacrylate is methyl methacrylate.

8. A polymer composition of claim 1, in which said base monomer ingredient is styrene.

9. A polymer composition of claim 1, in which said base monomer ingredient is a mixture of styrene and said alkyl methacrylate.

10. A process for producing an optically-transparent, neutron shielding polymer composition comprising polymerizing a base monomer containing as an essential mono-olefinic ingredient at least one monomer selected from the group consisting of (1) an alkyl methacrylate containing 1–4 carbon atoms in the alkyl group and (2) styrene in admixture with a boric acid ester of a polyol containing 3–16 carbon atoms and in which a molar ratio A of said polyol to boron atoms in said boric acid ester formed from said polyol being in the range of $0.6 < A < 4$, the boron content B (wt%) in the total monomer mixture being in the range of $1 \leq B < 6$.

11. A process as defined in claim 10, wherein said polyol is one which has 2–3 alcoholic hydroxyl groups and 3–13 carbon atoms.

12. A process as defined in claim 11, wherein said polyol is an aliphatic polyol.

13. A process as defined in claim 12, wherein said polyol is a 1,3-glycol of the general formula (I)

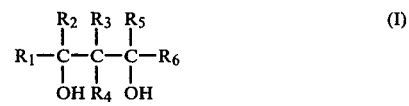

(I)

in which $R_1$, $R_2$, $R_3$, $R_5$ and $R_6$ are independently H or an alkyl group containing 1–10 carbon atoms, $R_4$ is H or an alkyl group containing 1–10 carbon atoms, $R_3$ and $R_4$ may represent a methylene group in combination thereof, and the total number of carbon atoms is in the range of 3–13 inclusive.

14. A process as defined in claim 13, wherein $R_1$, $R_2$ and $R_6$ are $CH_3$, $R_3$ and $R_4$ are H, and $R_5$ is H or $CH_3$.

15. A process as defined in claim 10, wherein the polymerization reaction is conducted at a temperature of 0° to 200° C. in the presence of an initiator for radical polymerization.

16. A process as defined in claim 15, wherein the polymerization reaction is conducted at a temperature of 20° to 180° C. in the presence of an initiator for radical polymerization.

17. A process as defined in claim 10, wherein the essential monomer is said alkyl methacrylate.

18. A process as defined in claim 17, wherein said alkyl methacrylate is methyl methacrylate.

19. A process of claim 10, in which said base monomer ingredient is styrene.

20. A process of claim 10, in which said base monomer ingredient is a mixture of styrene and said alkyl methacrylate.

* * * * *

UNITED STATES PATENT AND TRADEMARK OFFICE
CERTIFICATE OF CORRECTION

PATENT NO. : 4,275,174
DATED : June 23, 1981
INVENTOR(S) : Shin-ichi Tadokoro and Hirozo Segawa It is certified that error appears in the above—identified patent and that said Letters Patent is hereby corrected as shown below:

Col. 1, line 39; "proerty" should read -- property --
Col. 2, line 35; "sheilding" should read -- shielding --
Col. 2, line 45; "methacryalte" (second occurrence) should read -- methacrylate --
Col. 2, last word on line 45 and hyphenated to line 46; "methacryalte" should read -- methacrylate --
Col. 3, line 4; "methacryalte" should read -- methacrylate --
Col. 3, line 10; "on" should read -- or --
Col. 4, line 23; "monocinnamate," should read --monobenzoate,--

Col. 4, line 36; "1,2-proanediol" should read -- 1,2-propanediol --
Col. 5, line 10; "havinmg" should read -- having --
Col. 6, line 45; "That" should read -- that --
Col. 6, Table 1, Example No. 11, third column; "104" should read -- 184 --
Col. 7, Table 2; delete the line above example 36; column 2 starting with "19" to the last column ending with "0.19".

Signed and Sealed this

Ninth Day of February 1982

[SEAL]

Attest:

GERALD J. MOSSINGHOFF

Attesting Officer    Commissioner of Patents and Trademarks